United States Patent [19]

White et al.

[11] Patent Number: 4,806,602

[45] Date of Patent: Feb. 21, 1989

[54] ANHYDRIDE CAPPING POLYPHENYLENE ETHER WITH CARBOXYLIC ACID

[75] Inventors: Dwain M. White, Schenectady; Laura A. Socha, Troy, both of N.Y.

[73] Assignee: General Electric Company, Schenectady, N.Y.

[21] Appl. No.: 171,316

[22] Filed: Mar. 21, 1988

[51] Int. Cl.$^4$ ............................................. C08G 65/48
[52] U.S. Cl. ................................. 525/397; 528/212; 528/214; 528/215; 528/216
[58] Field of Search ................ 525/397; 528/212, 214, 528/215, 216

[56] References Cited

U.S. PATENT DOCUMENTS 3,375,228  3/1968  Holoch et al. .......................... 260/47
4,048,143  9/1977  Hay et al. .............................. 260/47
4,391,950  7/1983  Cooper ................................. 525/132
4,654,405  3/1987  Jalbert ................................. 525/397

FOREIGN PATENT DOCUMENTS 66452  4/1984  Japan .

Primary Examiner—Harold D. Anderson
Attorney, Agent, or Firm—William H. Pittman; James C. Davis, Jr.; James Magee, Jr.

[57] ABSTRACT

Polyphenylene ethers are capped by reaction at a temperature in the range of about 175°–350° C. with at least one carboxylic acid anhydride in the presence of a catalytic amount of at least one highly basic and/or nucleophilic amine. The capping reaction advantageously takes place in the melt. Blends of polyphenylene ethers with polystyrenes may also be capped.

20 Claims, No Drawings

ANHYDRIDE CAPPING POLYPHENYLENE ETHER WITH CARBOXYLIC ACID

This invention relates to polyphenylene ethers, and more particularly to the stabilization thereof by capping.

The polyphenylene ethers are a well known class of polymers, characterized by a unique combination of chemical, physical and electrical properties over a temperature range of more than 350° C., extending from a brittle point of about −170° C. to a heat distortion temperature of about 190° C. This combination of properties renders them suitable for use as engineering thermoplastics in a broad range of applications which are well known in the art and are disclosed in numerous patents and other publications.

The polyphenylene ethers generally comprise a plurality of structural units having the formula

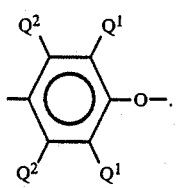

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are known. Illustrative homopolymers are those containing 2,6-dimethyl-1,4-phenylene ether units. Illustrative copolymers include random copolymers containing such units in combination with (for example) 2,3,6-trimethyl-1,4-phenylene ether units. Many such random copolymers, as well as homopolymers, are disclosed in the patent literature.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

A first class of operative catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds are also known. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are cobalt-containing catalyst systems. Suitable manganese and cobalt-containing catalyst systems for polyphenylene ether preparation are known in the art by reason of disclosure in numerous patents and publications.

A molecular feature of many polyphenylene ethers is the presence of end groups of at least one of the formulas

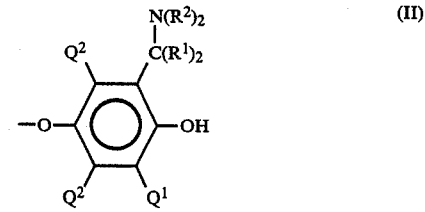

(II)

and

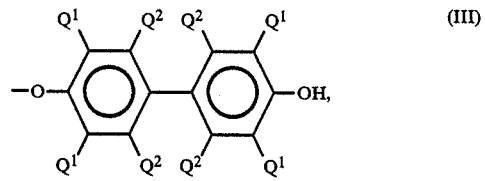

(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers with 4-hydroxybiphenyl end groups of formula III are typically obtained from reaction mixtures in which a by-product diphenoquinone of the formula

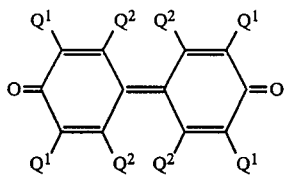

(IV)

is present, especially in a copper-halide-secondary or tertiary amine system. In this regard, the disclosures of U.S. Pat. Nos. 4,234,706, 4,477,649 and 4,482,697 are pertinent and are incorporated by reference herein. In mixtures of this type, the diphenoquinone is ultimately incorporated into the polymer in substantial proportions, largely as an end group.

Polymers containing the aminoalkyl-substituted end groups of formula II are obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

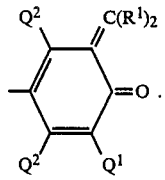

(V)

In many polyphenylene ethers obtained under the above-described conditions, a substantial proportion of the polymer molecules, typically constituting as much as about 90% by weight of the polymer, contain end groups having one or frequently both of formulas II and III.

The aminoalkyl end groups of formula II have numerous effects on the chemistry of the polyphenylene ether. Many of these effects are beneficial, often including an increase in impact strength and compatibilization with other blend components. Reference is made to the aforementioned U.S. Pat. No. 4,477,649 as well as U.S. Pat. Nos. 4,054,553, 4,092,294, 4,477,651 and 4,517,341, the disclosures of which are also incorporated by reference herein. Other effects, however, may be detrimental under circumstances such as those described hereinafter.

One disadvantage of the polyphenylene ethers is their tendency to become dark colored and brittle when exposed to extreme conditions such as those of high temperature, particularly in the presence of oxygen. It is believed that these phenomena are caused by oxidation of terminal hydroxy groups on the polyphenylene ether chain.

To suppress such oxidation, various capping methods are known. These include reaction with carboxylic acid anhydrides, as disclosed, for example, in U.S. Pat. Nos. 3,375,228 and 4,048,143. However, it is frequently found that reaction between the anhydride and the polyphenylene ether is incomplete, whereupon a substantial proportion of polyphenylene ether remains uncapped.

In addition, the capping reactions described in these patents are, for the most part, conveniently effected only in solution, through a procedure which requires dissolution and a solvent removal step which may be evaporation or precipitation with a non-solvent. Such solution reactions, normally conducted at relatively low temperatures, are not entirely effective since subsequent heating of the capped polyphenylene ether during processing results in the production of additional hydroxy groups, identified in the aforementioned U.S. Pat. No. 3,375,228 as "incipient hydroxyl groups". They may be generated by backbone rearrangement, illustrated as follows for two structural units in a poly(2,6-dimethyl-1,4-phenylene ether):

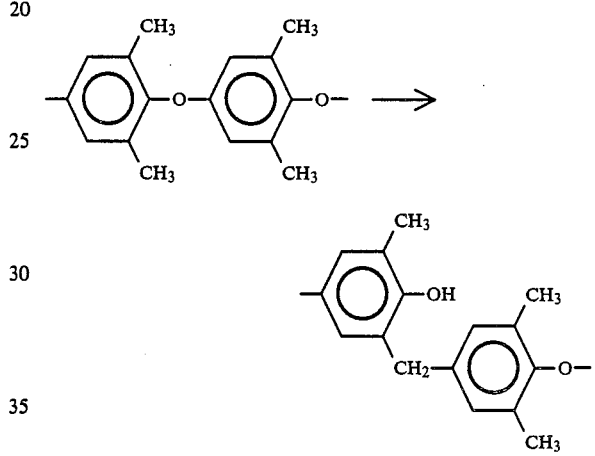

Any end groups of formula II may also decompose to regenerate primary or secondary amine and another quinone methide end group, which may in turn generate a 2,6-dialkyl-1-hydroxyphenyl end group. The mechanism of the latter reaction is not known with certainty, but it is believed to involve dehydrogenation of the regenerated amine with addition of the evolved hydrogen to the quinone methide.

U.S. Pat. No. 4,391,950 describes the reaction of polyphenylene ethers with benzoic anhydride in the melt. Under these conditions, capping might be expected to occur. However, the proportion of benzoic anhydride used (5% or less) is often insufficient for substantial capping, particularly when water and/or alcohols are present as impurities. Further, additional "incipient hydroxyl groups" formed during melt processing may remain uncapped.

The present invention provides an improved capping method employing anhydrides, whereby the efficiency of conversion to capped material and the yield of such material are improved by the use of a catalyst. Said method is particularly useful for melt capping, and may also be employed for solution capping under proper conditions.

The invention is a method for capping a polyphenylene ether which comprises contacting said polyphenylene ether with at least one carboxylic acid anhydride at a temperature in the range of about 175°–350° C. in the presence of a catalytic amount of at least one tertiary amine having a boiling point of at least about 180° C., the basic nitrogen atoms in said tertiary amine being directly bonded to at least two alkyl groups or being part of a six-membered aromatic ring.

The method of the invention is applicable to any known polyphenylene ether, including all of those described hereinabove. It is particularly useful with poly(2,6-dimethyl-1,4-phenylene ethers). Suitable polymers generally have a number average molecular weight within the range of about 3,000–40,000 and a weight average molecular weight within the range of about 20,000–80,000, as determined by gel permeation chromatography. Their intrinsic viscosities are most often in the range of about 0.35–0.6 dl./g., as measured in chloroform at 25° C.

For the most part, it is desirable for all hydroxy end groups on the polyphenylene ether to be capped by the method of this invention. However, the invention includes compositions which contain a proportion of uncapped polyphenylene ether; that is, polyphenylene ether containing terminal hydroxy groups.

The capping agent used according to the present invention is at least one carboxylic acid anhydride. Suitable anhydrides are disclosed in the aforementioned U.S. Pat. Nos. 3,375,228 and 4,048,143, the disclosures of which are incorporated by reference herein, and include such compounds as acetic anhydride, benzoic anhydride, succinic anhydride and isatoic anhydride. For melt capping, the anhydride should be substantially non-volatile at temperatures up to about 300° C.; benzoic anhydride is particularly useful under these conditions.

It is generally preferred to employ a proportion of the capping agent sufficient to react with all terminal hydroxy groups in the polyphenylene ether, and with any water and alcohol present as impurities. This proportion will depend to some extent on the molecular weight of the capping agent. For the most part, about 2.5–10% by weight of capping agent, based on polyphenylene ether, is adequate.

Proportions of at least about 3% are generally effective to cap any "incipient hydroxyl groups" formed during melt capping procedures, and are therefore preferred. When non-volatile capping agents such as benzoic anhydride are employed in amounts less than 3%, however, the use of a catalyst may improve their efficiency as reactants sufficiently for a substantial amount of capping to take place.

The use of an amine catalyst is a critical feature of the method of this invention. Said catalyst is at least one tertiary amine having a boiling point of at least about 180° C. and preferably at least about 225° C. This high boiling point is essentially to avoid loss of the catalyst by volatilization during the reaction, especially under melt capping conditions.

Suitable amines are those having a high degree of basicity and/or nucleophilicity. These include tertiary monoamines and polyamines in which each basic nitrogen atom is directly bonded to at least two alkyl groups or is part of a six-membered aromatic ring. In the latter instance, said basic nitrogen atoms are preferably the only nitrogen atoms in the ring.

Thus, the operative amines include aliphatic and alicyclic compounds such as N,N'-di-t-butylethylenediamine and 1,4-diaza[2.2.2]bicyclooctane, also known as triethylenediamine. Substituted pyridines in which the substituents are electron-releasing groups such as hydroxy and dialkylamino are often preferred. Especially preferred are 2-hydroxypyridine and 4-dimethylaminopyridine; in the latter compound, the dimethylamino nitrogen atom is the predominant basic/nucleophilic center.

The proportion of tertiary amine employed is an effective proportion to function as a catalyst. For the most part, this is about 0.1–1.0% and preferably about 0.5–1.0% by weight based on polyphenylene ether.

The temperature employed in the method of this invention is in the range of about 175°–350° C. Most often, a melt capping procedure is employed in which the temperature is in the range of about 200°–350° C. and especially about 250°–300° C. Said procedure can be conveniently conducted in an extruder or similar equipment. Under certain circumstances, it may be advantageous to extrude the polyphenylene ether with vacuum venting, thus removing a substantial proportion of any amines present therein, including those which form part of the oxidative coupling catalyst. The capping agent may then be advantageously introduced downstream from the polyphenylene ether feed.

Also contemplated are solution capping procedures in which the concentration of polyphenylene ether in the solvent is at least about 20% and preferably in the range of about 20–30% by weight. The solvents normally employed are relatively high boiling materials, typically aromatic hydrocarbons such as toluene or xylene or chlorinated aromatic hydrocarbons such as chlorobenzene, o-dichlorobenzene or 1,2,4-trichlorobenzene. These solvents, particularly the aromatic hydrocarbons and especially toluene, are characteristically employed in solution blending procedures for polyphenylene ethers.

It is also within the scope of the invention to include at least one polystyrene in the composition being capped. The term "polystyrene" as used herein includes polymers prepared by methods known in the art including bulk, suspension and emulsion polymerization, which contain at least 25% by weight of structural units derived from a monomer of the formula

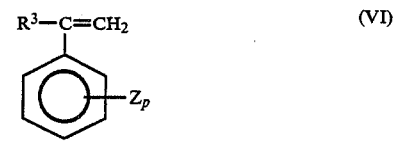

(VI)

wherein $R^3$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer. Polystyrenes are known to be miscible with polyphenylene ethers in all proportions, and any such blend may contain polystyrene in amounts of about 5–95% and most often about 25–75%, based on total resins.

The capped polyphenylene ethers prepared by the method of this invention are in many respects superior to uncapped polyphenylene ethers. For example, they are frequently much less susceptible to oxidative degradation at high temperatures, as demonstrated by a dramatic increase in time to embrittlement upon heat aging in air, and also by a decrease in oxygen uptake under high-temperature conditions. For the most part, tensile properties are not materially affected by capping. Depending on the capping agent used, the glass transition and heat distortion temperatures of the capped polymers may be lower than those of the corresponding uncapped polyphenylene ethers.

The invention is illustrated by the following examples.

EXAMPLE 1

A series of laboratory-scale experiments with various capping agents was conducted. In each experiment, a solution of the capping agent and catalyst (1% by weight based on polyphenylene ether) in pentane was added to a poly(2,6-dimethyl-1,4-phenylene ether) having an intrinsic viscosity in chloroform at 25° C. of about 0.48. The slurry was heated under nitrogen, with stirring, in a molten salt bath maintained at 300° C., until the pentane had been removed by distillation and the temperature of the mixture had risen to 270° C. Heating was then continued for 3 minutes, during which time the temperature rose to about 290° C.

The reaction vessel was removed from the salt bath and the contents were transferred to a beaker and dissolved in hot o-dichlorobenzene. The polymer was precipitated by the addition of methanol, filtered, dried, dissolved in toluene and again precipitated with methanol, washed with additional methanol and dried at 60° C. under vacuum. It was then analyzed by Fourier transform infrared spectroscopy, together with two standards: a polyphenylene ether which had been similarly heated in the absence of capping agent and a completely acetyl-capped polyphenylene ether. The results are given in Table I, in comparison with similar samples prepared without the use of a catalyst.

TABLE I

| Capping agent | | | |
|---|---|---|---|
| Identity | Wt. % | Catalyst | % capping |
| Acetic anhydride | 10 | 4-Dimethylaminopyridine | 93 |
| " | 10 | 2-Hydroxypyridine | 91 |
| " | 10 | N,N'—Di-t-butylethylenediamine | 85 |
| " |  | None | 41 |
| " | 6 | Triethylenediamine | 40 |
| " | 6 | None | 19 |
| " | 3 | 4-Dimethylaminopyridine | 79 |
| " | 3 | None | 17 |
| Benzoic anhydride | 3 | 4-Dimethylaminopyridine | 64 |
| " | 3 | 2-Hydroxypyridine | 53 |
| " | 3 | N,N'—Di-t-butylethylenediamine | 59 |
| " | 3 | None | 41 |
| Isatoic anhydride | 10 | 4-Dimethylaminopyridine | 54 |
| " | 10 | None | 46 |
| Succinic anhydride | 10 | 4-Dimethylaminopyridine | 42 |
| " | 10 | None | 27 |

EXAMPLE 2

The procedure of Example 1 was repeated, substituting a commercially available styrene homopolymer for 50% by weight of the polyphenylene ether and using 4-dimethylaminopyridine in the amount of 1% by weight of polyphenylene ether. The results are given in Table II, with the proportion of capping agent also being expressed as a percentage of polyphenylene ether.

TABLE II

| Capping agent | | | |
|---|---|---|---|
| Identity | Wt. % | Catalyst | % capping |
| Acetic anhydride | 10 | Yes | 99 |
| " | 10 | No | 53 |
| " | 6 | Yes | 89 |
| " | 3 | Yes | 83 |
| " | 3 | No | 48 |
| Benzoic anhydride | 5 | Yes | 93 |
| " | 5 | No | 68 |

What is claimed is:

1. A method for capping a polyphenylene ether which comprises contacting said polyphenylene ether with at least one carboxylic acid anhydride at a temperature in the range of about 175°–350° C. in the presence of a catalytic amount of at least one tertiary amine having a boiling point of at least about 180° C., the basic nitrogen atoms in said tertiary amine being directly bonded to at least two alkyl groups or being part of a six-membered aromatic ring.

2. A method according to claim 1 wherein the polyphenylene ether comprises a plurality of structural units having the formula

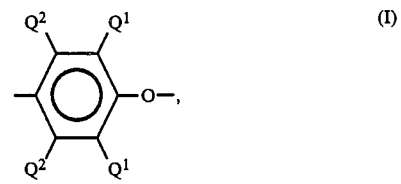

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein about 2.5–10% by weight of said anhydride is employed, based on polyphenylene ether.

4. A method according to claim 3 wherein each $Q^1$ is methyl and each $Q^2$ is hydrogen.

5. A method according to claim 4 wherein the anhydride is acetic, benzoic, isatoic or succinic anhydride.

6. A method according to claim 5 wherein contact is effected in the melt at a temperature of at least about 225° C.

7. A method according to claim 5 wherein the amine is N,N'-di-t-butylethylenediamine, 1,4-diaza[2.2.2]bicyclooctane or a substituted pyridine in which the substituents are electron-releasing groups.

8. A method according to claim 7 wherein the amine is N,N'-di-t-butylethylenediamine.

9. A method according to claim 7 wherein the amine is 1,4-diaza[2.2.2]bicyclooctane.

10. A method according to claim 7 wherein the amine is 2-hydroxypyridine.

11. A method according to claim 7 wherein the amine is 4-dimethylaminopyridine.

12. A method according to claim 4 wherein there is also present at least one polystyrene.

13. A method according to claim 12 wherein each $Q^1$ is methyl and each $Q^2$ is hydrogen.

14. A method according to claim 13 wherein the anhydride is acetic, benzoic, isatoic or succinic anhydride.

15. A method according to claim 14 wherein contact is effected in the melt at a temperature of at least about 225° C.

16. A method according to claim 14 wherein the amine is N,N'-di-t-butylethylenediamine, 1,4-diaza[2.2.2]bicyclooctane or a substituted pyridine in which the substituents are electron-releasing groups.

17. A method according to claim 16 wherein the amine is N,N'-di-t-butylethylenediamine.

18. A method according to claim 16 wherein the amine is 1,4-diaza[2.2.2]bicyclooctane.

19. A method according to claim 16 wherein the amine is 2-hydroxypyridine.

20. A method according to claim 16 wherein the amine is 4-dimethylaminopyridine.

* * * * *